Patented Jan. 14, 1930

1,743,925

UNITED STATES PATENT OFFICE

RICHARD F. KRAUSE, OF MASSILLON, OHIO

DRIP-COFFEE MAKER

Application filed May 18, 1929. Serial No. 364,168.

The invention relates to coffee pots for making drip coffee by the leaching action of boiling water upon the ground coffee.

The art of making drip coffee is well known, by suspending a coffee container, having a perforated bottom wall, within the upper portion of a pot or the like and supporting above the same a water reservoir having sundry minute perforations in its under side whereby boiling water placed in the water reservoir will be gradually supplied to the ground coffee for leaching the same in proper quantities to extract the strength therefrom, the coffee beverage dripping from the perforate bottom of the coffee container into the pot.

It has been common practice in the production of such drip coffee pots to provide a series of groups of apertures around the side walls of the ground coffee container to provide for air relief and permit the overflow of water, in the same manner as has been customary for years in the coffee containers of the ordinary percolators.

It has been found that with such a construction, a considerable portion of the boiling water from the water reservoir is quickly evacuated from the coffee container without passing through the ground coffee and absorbing the strength therefrom.

It has also been found by experience that when the boiling water from the water reservoir first contacts with the ground coffee in the coffee container, there is an ebullition or effervescence of the water, finer parts of the coffee and foam, which has a tendency to overflow the coffee container.

Where the openings are provided in the sides of the coffee container, this water and foam which effervesces, together with some of the coffee grounds, passes through these openings into the coffee beverage in the pot, tending to deteriorate the quality of the same.

The object of the present improvement is to dispense with the openings in the side of the coffee container, thus obviating the objections thereto and at the same time to provide a construction which will compensate for the initial ebullition or effervescence above described.

The above and other objects may be attained by providing a ground coffee container adapted to be supported within the upper portion of a coffee pot, which receives the beverage, this coffee container having a perforated bottom wall and an annular horizontal shoulder near its upper end provided with a continuous series of perforations to provide relief for the ebullition or effervescence caused by the contact of the boiling water with the ground coffee, a water reservoir being supported in the upper open end of the coffee container and provided with minute perforations in its bottom wall to permit the boiling water to be gradually discharged therefrom into the coffee container.

Figure 1:
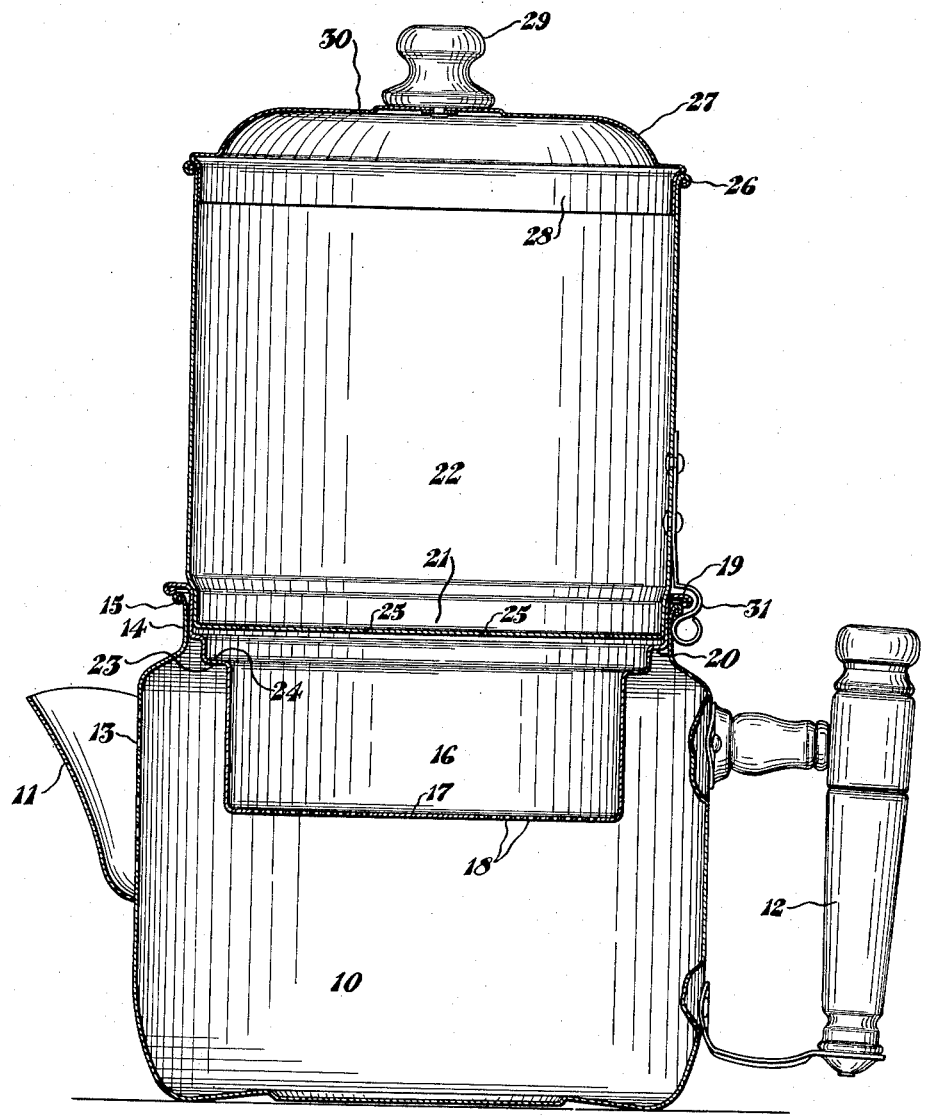
Figure 2:
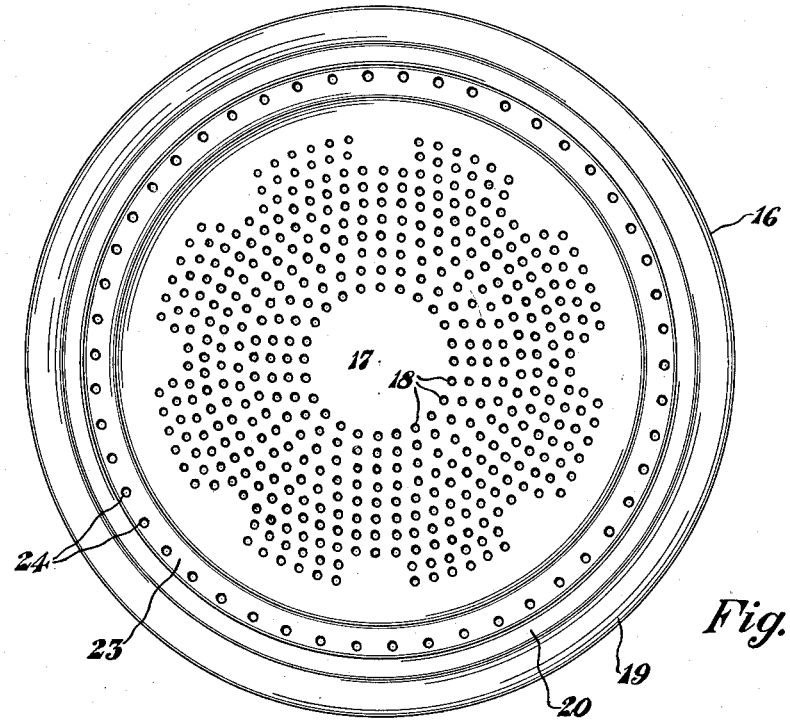

An embodiment of the invention is illustrated in the accompanying drawings forming part hereof, in which Figure 1 is a vertical longitudinal sectional view of the improved drip coffee maker;

Fig. 2, a bottom plan view of the ground coffee container; and

Figure 3:
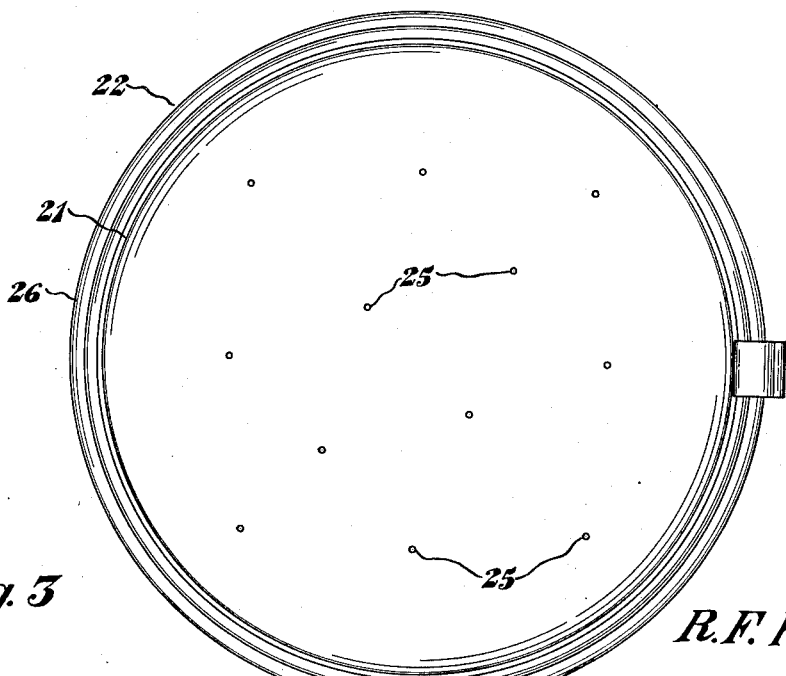

Fig. 3, a similar view of the hot water reservoir.

Similar numerals refer to similar parts throughout the drawings.

The coffee beverage receiving and dispensing pot is illustrated generally at 10 and may be provided with the usual pouring spout 11 and handle 12, the spout communicating with the interior of the pot as through a plurality of perforations 13 and the handle being connected to the side wall of the pot, diametrically opposite to the spout to provide for easily handling the pot and pouring the contents therefrom through the spout in usual manner.

A reduced neck 14 may be formed at the upper open end of the coffee pot and preferably provided with the usual rim bead 15 to receive and support the ground coffee container 16. This container may be substantially cylindrical in shape, provided with the perforate bottom wall 17 having a plurality of spaced apertures 18, of suitable size and number, to properly regulate the flow of the coffee beverage from the coffee container into the pot.

The upper open end of the coffee container is provided with the outturned peripheral flange 19 arranged to rest upon the rim bead 15 of the pot, and is shouldered as at 20 to receive the reduced lower end 21 of the water reservoir 22, a second shouldered portion 23 being formed below the same.

A continuous annular series of apertures 24 is provided in the shoulder 23 in order to provide relief for the ebullition or effervescence above referred to when the boiling water first contacts with the coffee in the container 16.

The bottom wall of the water reservoir is provided with the spaced plurality of minute apertures 25 to permit the boiling water to pass from the same at a controlled rate of speed into the coffee container.

The upper open end of the water reservoir may be provided with the peripheral rim bead 26 and the cover 27 is preferably provided with the depending peripheral flange 28 adapted to fit snugly within the upper end of the water container.

This cover is of such size that it may also fit within the reduced neck 14 of the pot 10 so that if desired, after the coffee has been made, the coffee container and water reservoir may be removed from the pot and the cover placed thereon for serving the coffee therefrom.

A handle knob 29 is preferably provided upon the cover for the purpose of placing the same upon the water reservoir or pot and removing it therefrom, and for the purpose of preventing the formation of a vacuum within the water reservoir, and to permit the boiling water to flow therefrom, an air vent 30 may be provided in the cover.

When it is desired to use the improved coffee maker for making drip coffee, the coffee container 16 is placed within the upper portion of the coffee pot, the flange 19 resting upon the bead 15 of the reduced neck 14 of the pot in the manner shown in Fig. 1.

The desired quantity of ground coffee is then placed within the coffee container, being sufficient to give the required quantity of coffee beverage of proper strength. It has been found by experience that one tablespoonful of ground coffee is sufficient to brew one cup of coffee beverage of excellent quality.

The hot water reservoir 22 is then placed in position upon the coffee container, as shown in Fig. 1, the reduced lower end 21 thereof fitting within the shouldered portion 20 of the coffee container.

For the purpose of holding the parts tightly together and permitting pouring of the coffee beverage from the pot without the necessity of removing the water reservoir or coffee container, a spring catch 31 may be provided upon the water reservoir and adapted to fit over the rim bead 15 of the pot, preventing the water reservoir and ground coffee container from becoming accidentally disengaged from the pot when the same is tilted.

The proper quantity of boiling water is then poured into the water reservoir and the cover placed thereon. The boiling water will be discharged from the reservoir through the minute openings 25 into the ground coffee container, being gradually supplied thereto in the proper quantity for extracting the strength from the ground coffee, after which it will drip through the apertures 18 into the pot.

When the boiling water first contacts with the ground coffee, it will cause an ebullition or effervescence, water, foam and some of the finer parts of the ground coffee bubbling or boiling up in the coffee container.

The series of openings 24 provided in the upper portion of the coffee container will quickly relieve this condition and as soon as it subsides, the leaching action will continue without further ebullition or effervescence, all of the boiling water passing through the ground coffee in a period of about six to ten minutes, depending upon the quantity of coffee beverage to be made.

Moreover, the side wall of the coffee container below the shoulder being imperforate, none of the water or grounds ebullating can pass through the side walls, but all of the water is compelled to pass through the entire body of coffee in the container, the only outlet therefor being the perforated bottom wall of the container.

The shoulder at the upper portion of the coffee container is used for the purpose of enlarging the area of the upper end of the container, above the level and the pressure of the water and the coffee grounds; so that the apertures in the shoulder are at all times free for the passing of air from the coffee container, without any clogging of the apertures by the water or the grounds, and free from the swelling pressure thereof.

And the apertures are located in the shoulder at the upper portion of the coffee container, as distinguished from apertures in the side wall thereof, so as to permit a free exit of air from the container above the level of the water and the grounds therein, and so as to require all of the water to pass through the grounds to drain through the apertures in the bottom of the container, instead of escaping through apertures in the side wall thereof.

I claim:

1. A coffee maker including a water reservoir having apertures in its lower portion, a coffee container below the water reservoir, and an annular shoulder at the upper portion of the coffee container, said shoulder having apertures therein, and the side wall of the container being imperforate below the shoulder.

2. A coffee maker including a water reservoir having apertures in its lower portion, a coffee container below the water reservoir, and a horizontal annular shoulder at the upper portion of the coffee container, said shoulder having apertures therein, and the side wall of the container being imperforate below the shoulder.

3. A coffee maker including a water reservoir having apertures in its lower portion, a coffee container below the water reservoir, and an annular shoulder at the upper portion of the coffee container, said shoulder having a continuous series of apertures therein, and the side wall of the container being imperforate below the shoulder.

4. A coffee maker including a water reservoir having apertures in its lower portion, a coffee container below the water reservoir, and a horizontal annular shoulder at the upper portion of the coffee container, said shoulder having a continuous series of apertures therein, and the side wall of the container being imperforate below the shoulder.

5. A coffee maker including a water reservoir having apertures in its lower portion, a coffee container having a shouldered upper portion to receive the lower portion of the water reservoir, and a second shoulder on the coffee container and having apertures therein, and the side wall of the container being imperforate below the shoulder.

6. A coffee maker including a water reservoir having apertures in its lower portion, a coffee container having a shouldered upper portion to receive the lower portion of the water reservoir, and a second horizontal shoulder on the coffee container and having apertures therein, and the side wall of the container being imperforate below the shoulder.

7. A coffee maker including a water reservoir having apertures in its lower portion, a coffee container having a shouldered upper portion to receive the lower portion of the water reservoir, and a second shoulder on the coffee container and having a continuous series of apertures therein, and the side wall of the container being imperforate below the shoulder.

8. A coffee maker including a water reservoir having apertures in its lower portion, a coffee container having a shouldered upper portion to receive the lower portion of the water reservoir, and a second horizontal shoulder on the coffee container and having a continuous series of apertures therein, and the side wall of the container being imperforate below the shoulder.

In testimony that I claim the above, I have hereunto subscribed my name.

RICHARD F. KRAUSE.